United States Patent
O'Conner

(10) Patent No.: US 6,232,911 B1
(45) Date of Patent: May 15, 2001

(54) DEVICE FOR DISTANCE MEASUREMENT BY RADAR

(76) Inventor: Joe Scott O'Conner, Tulpanstrasse 5 88630, Aach-Linz (DE)

( * ) Notice: Subject to any disclaimer, the term of this patent is extended or adjusted under 35 U.S.C. 154(b) by 0 days.

(21) Appl. No.: 08/371,995

(22) Filed: Jan. 12, 1995

(30) Foreign Application Priority Data

Jan. 12, 1994 (DE) ................................................. 44 00 623

(51) Int. Cl.[7] ................................................. G01S 13/34
(52) U.S. Cl. ................................................. 342/128; 342/109
(58) Field of Search ................................................. 342/104, 107, 342/109, 118, 128

(56) References Cited

U.S. PATENT DOCUMENTS

| | | | |
|---|---|---|---|
| 4,079,377 | * | 3/1978 | Zur Heiden et al. ................. 342/109 |
| 4,205,314 | * | 5/1980 | Strauch ................................... 342/87 |
| 4,245,221 | * | 1/1981 | Kipp et al. ............................. 342/128 |
| 4,429,309 | * | 1/1984 | Kipp ....................................... 342/128 |
| 4,739,330 | * | 4/1988 | Lazarus ................................. 342/128 |
| 5,072,223 | * | 12/1991 | Hethuin et al. ....................... 342/128 |

* cited by examiner

*Primary Examiner*—Ian J. Lobo
(74) *Attorney, Agent, or Firm*—James Creighton Wray; Meera P. Narasimhan

(57) ABSTRACT

A device for distance measurement by radar comprises a frequency modulated radar-transmitter and -receiver (10) by which a radar beam is directed onto an object to be measured and in which by mixing the transmitted and the received frequency a beat signal (30) is obtained. By use of frequency modulation (16) the frequency of the transmitted radar signal of the radar-transmitter and -receiver is variable periodically according to a saw tooth function. The frequency of the beat signal, due to the travel time of the radar signal reflected by the object, represents a measured value for the distance of the object. A signal processing circuit generates from the beat signal obtained a measured value of the distance. For this purpose the beat signal is fed into a phase control circuit or phase locked loop circuit (66) the output frequency of which makes the measured value of distance.

11 Claims, 3 Drawing Sheets

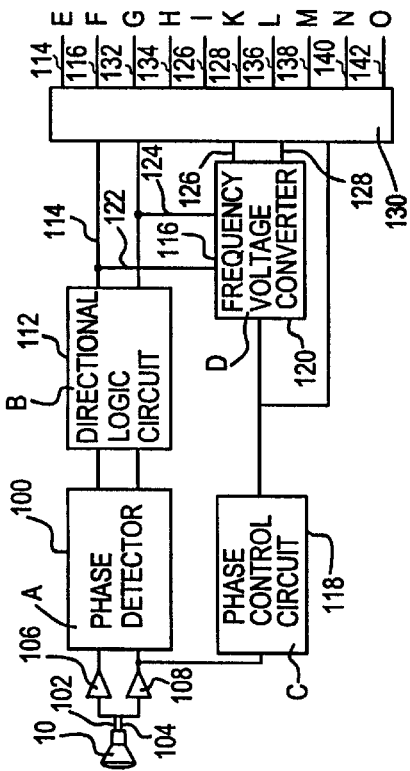
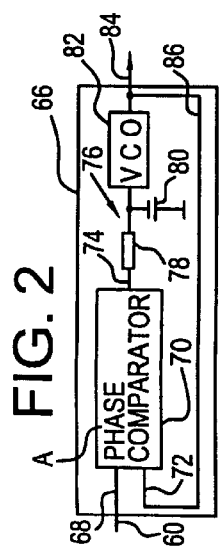
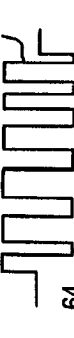
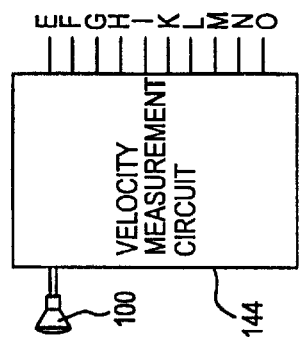
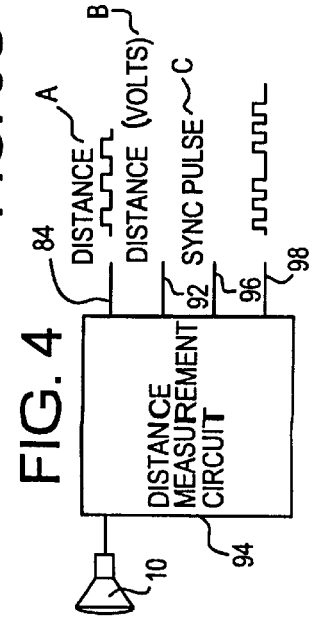

DEVICE FOR DISTANCE MEASUREMENT BY RADAR

BACKGROUND OF THE INVENTION

The application refers to a device for distance measurement by radar comprising a frequency modulated radar-transmitter and -receiver by which a radar beam is guided onto an object to be measured and which, by mixing of the transmitted frequency with the received frequency, delivers a beat signal; frequency modulating means, by which the transmitted frequency of the radar signal of the doppler signal device is periodically variable in a saw-tooth shaped way and wherein the frequency of the beat signal, due to the travel time of the radar beam reflected by the object, is a measure for the distance of the object, and a signal processing circuit generating a measured value from the beat signal obtained.

Devices of this kind are known. In the radar-transmitter and -receiver mixing takes place of the transmitted and the received signal. The signal received has passed the distance to and from the object, thereby has been transmitted at an earlier instant and thereby has, due to the saw-tooth modulation, a frequency which is a bit different from the frequency of the signal which is emitted at the moment of reception. Thereby a beat frequency occurs. This beat frequency is proportional to the travel time to the object and thereby to the distance from the object to the radar-transmitter and -receiver.

SUMMARY OF THE INVENTION

It is an object of the present invention in a device as defined above, to simplify and to improve measurement and display of the beat frequency.

According to the invention the solution of this problem is achieved by locking the beat signal onto a phase locked loop circuit the output frequency of which forms the measured value of the distance.

The beat signal usually has a high noise factor. Due to nonlinearities of the mixer frequency variations or fluctuation will occur. The beat signal is made of individual signal groups corresponding to the slowly rising edge of the "saw-tooth". In the area of the steep edge of the saw-tooth beat signals of high frequency occur. By use of a phase locked loop circuitry throughgoing signals are generated, gaps are bridged and frequency fluctuations are averaged. The noise component is low. Signals of this kind can be processed easily.

In a further embodiment of the invention in addition to the distance measurement device a velocity measurement device made up with a doppler signal device may be provided and the distance- resp. -velocity measured values, delivered by the distance measurement device and the velocity measurement device, may be combined.

A combined distance- and velocity- measurement device as set out offers a plurality of applications as will be explained below.

Further embodiments of the invention are subject matters of the subclaims.

An example of the invention is described in detail below with reference to the drawings.

BRIEF DESCRIPTION OF THE DRAWINGS

FIG. 2 is a block diagram of a phase locked loop circuit as used in the device of FIG. 1.

FIGS. 3A to 3G indicates signal passages in various positions of the circuitry of FIG. 1.

FIG. 4 is a block diagram of the device for distance measurement of FIG. 1.

FIG. 5 is a block diagram of a device for velocity measurement.

FIG. 6 is a block diagram of the device for velocity measurement of FIG. 5.

DETAILED DESCRIPTION OF THE PREFERRED EMBODIMENTS

Figure 1:
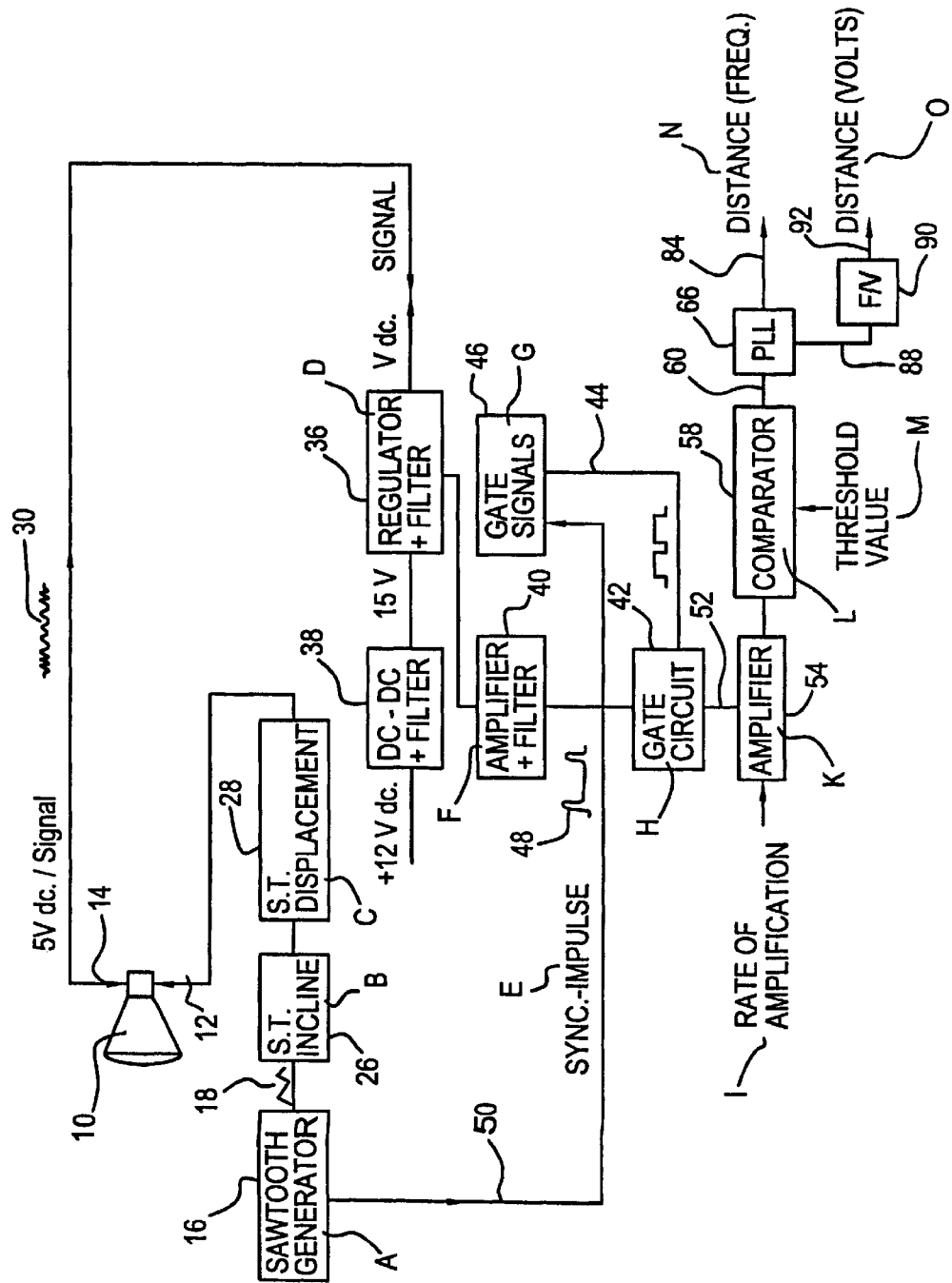
FIG. 1 is a block diagram of a device for distance measurement by radar.

In FIG. 1 reference numeral 10 indicates a frequency modulated radar transmitter and receiver. The frequency of the transmitted radar signal is variable by a voltage applied to the input 12 in a way known in the art by means of a varactor and not demonstrated in detail. To the input 14 a service voltage of −5V for the radar transmitter und receiver is applied. Further, the input 14 serves as an output for a beat signal.

A saw tooth generator 16 supplies a periodic saw tooth voltage or signal 18. The saw tooth signal 19 is demonstrated in detail in FIG. 3A. The saw tooth signal 19 comprises a steeply rising flank 20 and a considerably slower decreasing flank 22. Between the individual "saw teeth" there may be an interval 24. By means 26 for controlling the rise in the steepness of the flanks, of the saw tooth signal may be adjusted. Displacement control means 28 allow a vertical adjustment of the saw tooth voltage. The saw tooth signal as obtained is applied to the varactor of the radar transmitter and receiver 10 and serves for corresponding modulation of the transmitted radar signal.

In the radar transmitter and receiver the transmitted frequency and the frequency reflected and received from the object are mixed. The frequencies are different due to the finite travel time to and from the object. During the travel time of the radar signal the frequency of the now transmitted radar signal has decreased in correspondence with the saw tooth voltage. By mixing beat signals 30 a finite beat frequency are obtained.

These beat signals are schematically represented in the second line of FIG. 3B. The beat signals have a high frequency in the rising flanks 20 of the saw tooth signal 18. This is indicated at 32 in FIG. 3. The steep increase of the saw tooth voltage has the effect that, during the travel time of the radar signal, the frequency of the transmitter is altered, relatively, to a considerable amount. The frequency difference or beat frequency will consequently be high. Then a sinus type signal of a lower frequency occurs. The frequency may fluctuate somewhat due to nonlinearities, as indicated in FIG. 3B. Also, the signal may comprise noise, as indicated at 34 in FIG. 3B.

In FIG. 1 36 indicates a voltage regulation device combined with a filter. The voltage regulation device receives a DC voltage of −15 volts from a DC/DC transducer 38, in which a DC supply voltage of +12 volts is transduced into a DC voltage of −15 volts. From this the voltage regulation device 36 generates a stabilized or controlled DC voltage of −5 volts which is fed into the radar transmitter and receiver 10 through its input 14. The filter of the voltage regulation device and filter 36 filters the beat signal 30 and supplies it to an amplifier 40. The amplifier 40 acts as a filter too. The amplifier 40 suppresses the DC component of the beat signal 30. The filtered beat signal 30 is applied to a gate circuit 42. The gate circuit can be opened by gate signals 44. The gate signals 44 are displayed in the third line of FIG. 3C. The gate signals are "H", which is, logically "ONE" from the start of the descending flank 22 of the saw tooth signal 18 until the end of this descending flank 22. Otherwise the gate signals are "L", which is logically "ZERO": By the gate signal "H" the gate circuit 42 is opened. At gate signal "L" the gate circuit is closed. The gate signals 44 are supplied by a gate signal transmitter 46. The gate signal transmitter 46 receives synchronization pulses 48 from the saw tooth generator 16 via line 50. At the output of gate circuit 42 thereby occur signals 52, as they are diagrammatically displayed in line 4 of FIG. 3D. The signals 52 correspond with the beat signal 30, however, they are released from the signal parts of high frequency which occur in the steeply rising flanks 20. They contain only the beat frequency signals 34 obtained during the slowly descending flank 22.

The thus obtained signals 52 are fed into an amplifier 54 of variable rate of amplification. The amplifier 54 is overdriven by signals 52. The amplifier 54 thereby delivers rectangular signals 56 which can be seen in the fifth line of FIG. 3E. These rectangular signals are applied to a comparator 58. The comparator 58 gives an adjustable threshold value. When the rectangular signal 56 exceeds this threshold value the output of the comparator is "H". When the rectangular signal does not exceed the threshold value the output of the comparator is "L". Thereby at the output of the comparator 58 a signal 60 occurs which is shown in the sixth line of FIG. 3F. This signal 60 is made up by sequences 60 of rectangular pulses between which gaps 64 occur. As a consequence of the irregularities of the beat frequency signal 30 the pulse widths of the rectangular signals are not identical. Also the frequency of the rectangular signal varies.

The thus obtained signals 60 are fed into a phase control circuit or phase locked loop circuit 66. The phase locked loop circuit 66 is schematically shown in FIG. 2. To an input 68 of a phase comparator 70 the signal 60 from the comparator 58 is applied. To a second input 72 of the phase comparator a feedback signal is applied. The output signal of the phase comparator at an output 74 is fed into an integrating network 76. The integrating network is made up of a resistor 78 and a capacitor 80. This integrating network 76 has a large time constant. The voltage at the capacitor 80 is applied to the input of a voltage sensitive oscillator 82. The voltage sensitive or voltage controlled oscillator delivers an output signal the frequency of which is proportional to the voltage applied to its input. This output signal at one hand occurs at the output 84 of the phase locked loop circuit 66, and thereby at an output of the complete measuring device. At the other hand the output signal is fed back to the input 72 of the comparator 70 by a feedback loop 86.

Phase locked loop circuits of this kind are known in the art.

At a phase difference between the signal at the input 68 and the feedback signal at input 72 at the phase locked loop circuit 70 an output signal appears of the one or the other polarity. This output signal charges or discharges with a large time constant the capacitor 80. The output frequency of the voltage controlled oscillator 82 follows generally the average value of the frequencies at the input. The voltage at capacitor 80 does not vary considerably when during short intervals the input signal at input 68 disappears as here is the case due to the gate circuit 42. Also, distortions or irregularities of signal 52 do not influence the output signal. Thereby a continuous and regular output signal 88 appears without gaps and with a constant frequency corresponding to the average value of the frequency of the signal 52, as can about be seen in the last line of FIG. 3G.

The frequency of this signal is proportional to the distance between radar-transmitter and -receiver and the target.

The signal 88 is by the phase lock loop circuit 66 at the same time supplied to the frequency voltage converter 90. The frequency voltage converter 90 supplies at an output 92 an output voltage which is proportional to the frequency of the signal 88. This output voltage also represents a measured value for the distance between the target and the radar-transmitter and -receiver.

In FIG. 4 the described signal processing circuit is displayed as block 94. Besides the two abovementioned outputs 84 and 92 the circuit has another output 96 at which the synchronization pulse 48 can be taken off by the line 50. Another output 98 allows the signal 52 from the output gate circuit 42 to be taken off.

FIG. 5 shows a device for velocity measurement. The velocity measurement device comprises a doppler signal transmitter 100. The doppler signal transmitter comprises two mixer diodes. The mixer diodes are arranged in such a way that they deliver at two outputs 102 and 104 two doppler signals which are dephased against each other by 90°. For the time being the one or the other of these signals leads the other, depending on whether the target approaches or deviates from the doppler signal transmitter. The two doppler signals are amplified in amplifiers 106 and 108. The amplified doppler signals are fed into a phase detector 100. The phase detector 100 determinates whether the picked up target approaches or deviates. A directional logic circuit correspondingly delivers logic signals at two outputs 114 or 116. When the picked up target approaches output 114 is "H". When the picked up target deviates output 116 is "H".

The amplified doppler signal from output 104 also is fed into a phase control circuit 118. The phase control circuit 118 is built up in the same way as the phase control circuit 66 of FIG. 1 which is shown in detail in FIG. 2. The phase control circuit 118 generates from the doppler signals a signal sequence of defined frequency which alters very slowly even in case of fluctuations of frequency or of other disturbances.

The output frequency of phase control circuit 118 is fed into a frequency-voltage-converter 120. The frequency-voltage-converter 120 via lines 122 and 124 receives the logic signals from outputs 114 resp. 116 of the directional logic circuit 112. The frequency-voltage-converter 120 delivers a voltage which is proportional to the output frequency of the phase control circuit and thereby to the relative velocity of the target, either at an output 126 when the target approaches or at an output 128 when the target deviates.

The various signals arising in the circuit of FIG. 5 are fed to output and part of them are interlaced. This is shown by a linkage circuit 130 in FIG. 5.

On output 114 the logic signal of direction appear which becomes "H" when the target approaches. On output 116 the logic signal of direction appears which becomes "H" when the target deviates. An output 132 becomes "H" when a picked up target moves, no matter whether the target approaches or deviates. On an output 134 a voltage appears which is proportional to the relative velocity of the target, no matter whether the target approaches or deviates. On output 126 a voltage appears which is proportional to the velocity of approach of the target. On output 128 a voltage appears which is proportional to the velocity of deviation of the target. On an output 136 a signal sequence appears the frequency of which corresponds with the relative velocity between target and doppler signal transmitter 100, no matter whether the target approaches or deviates. On an output 138 a signal sequence appears the frequency of which corresponds with the relative velocity between target and doppler signal transmitter 100 when the target approaches. On an output 140 a signal sequence appears the frequency of which corresponds with the relative velocity between target and doppler signal transmitter 100 when the target deviates. On an output 142 a signal is generated when the target exceeds a predetermined velocity.

In FIG. 6 the device for velocity measurement of FIG. 5 is shown as a block 144 with the various outputs.

Figure 7:
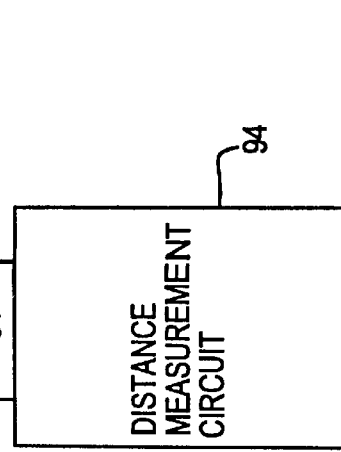
FIG. 7 shows a combined distance and velocity measurement device.

FIG. 7 shows the combination of a device 94 for distance measurement and a device 114 for velocity measurement in which the information supplied by devices 94 and 114 are combined.

The device 94, which is built up according to FIG. 1 or in an other suitable way, delivers the distance to the target as a voltage at output 92 or, at an output 84 a signal sequence the frequency of which is proportional to the distance. Outputs 92 and 84 are connected with a device 144. Device 144 is built up according to FIG. 5 or in an other suitable way. By linkage of information from both devices 94 and 144 various measured values can be taken off at outputs 146 to 154.

At output 146 a signal sequence appears the frequency of which is proportional to the distance to an approaching target. At output 148 a signal sequence appears the frequency of which is proportional to the distance to a deviating target. At output 150 a signal sequence appears the frequency of which is proportional to the distance to a moving target, no matter whether the target approaches or deviates. At output 152 a voltage appears which is proportional to the distance of an approaching target. At output 154 a voltage appears which is proportional to the distance of a deviating target.

Figure 8:
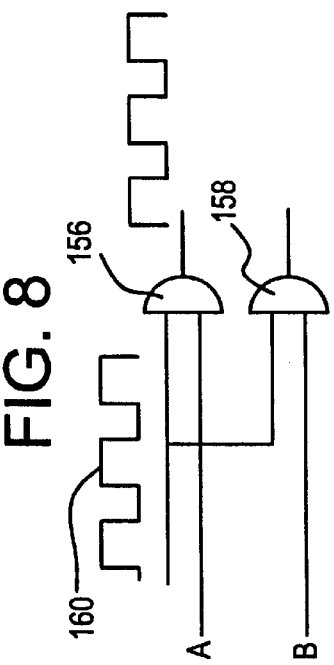
FIG. 8 shows an example of the combination of signals in the device of FIG. 7.

FIG. 8 shows an example of a linkage of a signal sequence the frequency of which represents distance or relative velocity of the target by logic signals "H" or "L" which indicate approach or deviation of the target. Linkage takes place by two AND circuits 156 and 158. To one input of each AND circuit 156 and 158 the signal sequence 160 is applied. To the second input of the AND circuit 156 a signal is applied which is "H" when the target approaches. To the second input of the AND circuit 158 a signal is applied which is "H" when the target deviates. Depending on which second input the "H" signal appears, the signal sequence appears at the output of AND circuit 156 or at the output of AND circuit 158. The second inputs of the AND circuits can for example be connected with the outputs 114 resp. 116 of the directional logic circuit 112 in FIG. 5.

At it is known by persons skilled in the art and therefore not described in detail, signals can be generated at the outputs which signals supply measured values for the velocity of the target in the form of frequency or voltage in dependency of the distance of the target.

Figure 10:
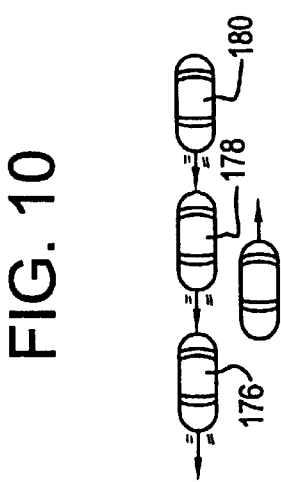
FIG. 10 demonstrates a further application of a combined distance and velocity measurement device.
Figure 11:
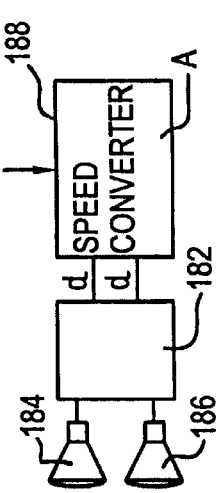
FIG. 11 shows diagrammatically a device for controlling the distance between vehicles in use according to FIG. 10.
Figure 9:
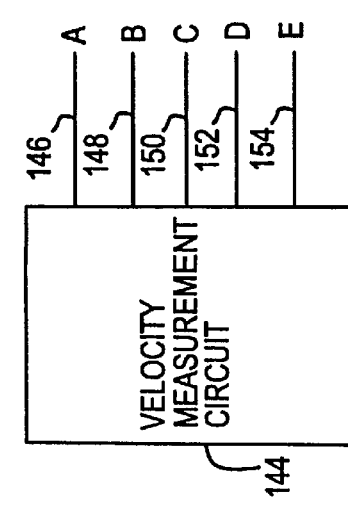
FIG. 9 demonstrates an application of a combined distance and velocity measurement device.

FIGS. 9 to 11 show various applications of combined devices for measurement of distance and velocity.

In FIG. 9 a combined device 162 for measurement of distance and velocity is placed next to a road 164. A radar lobe which is indicated by waves 166 extends under a narrow angle to the direction of drive along the road 164. Vehicles 168, 170 and 172 are driving on road 164. For traffic monitoring vehicles exceeding a predetermined speed limit are photographed by a camera which is controlled by the device for measurement of distance and velocity. In the case shown the vehicles 168, 170 and 172 will appear on the photo. For obtaining a measurement and photo which conclusively gives proof of a violation of traffic regulations, it has to be evident which one of the three vehicles visible on the photo has been driven with the measured excessive speed. By simultaneous measurement of distance a predetermined range of distance 174 can be given. Only those velocity measurements are fed out which refer to targets within the above range of distance. In the case given here it can therefore clearly be established that the measurement refers to vehicle 170.

By additional distance measurement it is possible to establish on which of several lanes the vehicle to which the measurement refers, is driving.

FIGS. 10 and 11 show a further application. Three vehicles 176, 178 and 180 are driving in the same direction and with a small clearance from each other. Each vehicle 176, 178, 180 carries a distance and velocity measuring device 182 comprising radar-transmitter and -receiver 184 resp. 186. The distance and velocity measuring device 182 supplies the distance d to the preceding vehicle and the variation of distance d which is the relative velocity. These two measured quantities are fed into a speed controller 188. The speed controller 188 controls the velocity of the vehicle in such a way that a predetermined clearance $d_s$ is maintained. Such a controller is a PID controller. It allows for a small clearance between vehicles. The controller reacts practically without reaction time. The controller detects not only the distance but even the variation of distance and can react very quickly.

TRANSLATION OF GERMAN REFERENCES IN DRAWINGS

FIG. 1
A SAW TOOTH GENERATOR
B S T INCLINE
C S T DISPLACEMENT
D VOLTAGE REGULATION (OR CONTROL) DEVICE PLUS FILTER
E SYNC PULSES
F AMPLIFIER PLUS FILTER
G GATE SIGNALS
H GATE CIRCUIT
I RATE OF AMPLIFICATION
K AMPLIFIER
M TRESHOLD VALUE
N DISTANCE (FREQ)
O DISTANCE (VOLTS)
FIG. 2
A PHASE COMPARATOR
FIG. 4
A DISTANCE
B DISTANCE (VOLTS)
C SYNC PULSE
FIG. 5
A PHASE DETECTOR
B DIRECTIONAL LOGIC CIRCUIT
C PHASE CONTROL CIRCUIT
D FREQUENQY VOLTAGE CONVERTER

E APPROACH (LOGIC)
F DEVIATE (LOGIC)
G TARGET (LOGIC)
H RELATIVE VELOCITY (VOLTS)
I VELOCITY OF APPROACH (VOLTS)
K VELOCITY OF DEVIATION (VOLTS)
L RELATIVE VELOCITY (FREQUENCY)
M VELOCITY OF APPROACH (FREQUENCY)
N VELOCITY OF DEVIATION (FREQUENCY)
O EXCESS VELOCITY
FIG. 6
E to O same as FIG. 5
FIG. 7
A DISTANCE TO APPROACHING TARGET (FREQUENCY)
B DISTANCE TO DEVIATING TARGET (FREQUENCY)
C DISTANCE TO MOVING TARGET (FREQUENCY)
D DISTANCE TO APPROACHING TARGET (VOLTS)
E DISTANCE TO DEVIATING TARGET (VOLTS)
F DISTANCE (VOLTS)
G DISTANCE (FREQUENCY)
FIG. 8
A APPROACH
B DEVIATION
FIG. 11
A SPEED CONTROLLER

What is claimed is:
1. Device for distance measurement by radar, comprising:
   (a) a distance measuring device having a frequency modulated radar-transmitter and -receiver (10) for guiding a radar beam onto an object to be measured and reflecting said beam from the object and for mixing of a transmitted frequency with a received frequency, a beat signal (30) generated by mixing the transmitted and received frequencies,
   (b) frequency modulator connected to the radar-transmitter and -receiver for periodically varying the transmitted frequency of the radar signal of the radar-transmitter and -receiver as a saw tooth function and wherein the frequency of the beat signal corresponds to a travel time of the radar beam reflected by the object to indicate a measure of a distance of the object and
   (c) a signal processing circuit connected to the modulator generating a measured value corresponding to the distance of the object and,
   (d) a phase control circuit (phase locked loop circuit) (66) connected to the modulator for feeding the beat signal and for providing an output frequency, the output frequency forming the measured value of the distance,
   further comprising a frequency voltage converter connected to the phase control circuit, wherein the output frequency of the phase control circuit (66) is fed into the frequency voltage converter (90) which supplies an output voltage which is proportional to the beat frequency and represents the measured value for the distance.

2. Device for distance measurement by radar, comprising:
   (a) a distance measuring device having a frequency modulated radar-transmitter and -receiver (10) for guiding a radar beam onto an object to be measured and reflecting said beam from the object and for mixing of a transmitted frequency with a received frequency, a beat signal (30) generated by mixing the transmitted and received frequencies,
   (b) frequency modulator connected to the radar-transmitter and -receiver for periodically varying the transmitted frequency of the radar signal of the radar-transmitter and -receiver as a saw tooth function and wherein the frequency of the beat signal corresponds to a travel time of the radar beam reflected by the object to indicate a measure of a distance of the object and
   (c) a signal processing circuit connected to the modulator generating a measured value corresponding to the distance of the object and,
   (d) a phase control circuit (phase locked loop circuit) (66) connected to the modulator for feeding the beat signal and for providing an output frequency, the output frequency forming the measured value of the distance,
   further comprising a gate circuit operable by rectangular signals, wherein the beat signals (30), after being filtered, are fed into the gate circuit (42) which can be activated by the rectangular signals (44) which are synchronized with the saw tooth signals (18).

3. Device for distance measurement by radar, comprising:
   (a) a distance measuring device having a frequency modulated radar-transmitter and -receiver (10) for guiding a radar beam onto an object to be measured and reflecting said beam from the object and for mixing of a transmitted frequency with a received frequency, a beat signal (30) generated by mixing the transmitted and received frequencies,
   (b) frequency modulator connected to the radar-transmitter and -receiver for periodically varying the transmitted frequency of the radar signal of the radar-transmitter and -receiver as a saw tooth function and wherein the frequency of the beat signal corresponds to a travel time of the radar beam reflected by the object to indicate a measure of a distance of the object and
   (c) a signal processing circuit connected to the modulator generating a measured value corresponding to the distance of the object and,
   (d) a phase control circuit (phase locked loop circuit) (66) connected to the modulator for feeding the beat signal and for providing an output frequency, the output frequency forming the measured value of the distance,
   further comprising a comparator connected to the frequency modulator, wherein the beat signals are fed into the comparator (58) to be compared with a threshold value and the output signals of the comparator (58) are fed into the phase control circuit (66).

4. Device as claimed in claim 3 characterized in that an amplifier (54) of variable rate of amplification is connected to the modulator and the comparator (58).

5. Device as claimed in claim 3 characterized in that the threshold value of the comparator (58) is adjustable.

6. Device for distance measurement by radar, comprising:
   (a) a distance measuring device having a frequency modulated radar-transmitter and -receiver (10) for guiding a radar beam onto an object to be measured and reflecting said beam from the object and for mixing of a transmitted frequency with a received frequency, a beat signal (30) generated by mixing the transmitted and received frequencies,
   (b) frequency modulator connected to the radar-transmitter and -receiver for periodically varying the transmitted frequency of the radar signal of the radar-transmitter and -receiver as a saw tooth function and wherein the frequency of the beat signal corresponds to a travel time of the radar beam reflected by the object to indicate a measure of a distance of the object and
   (c) a signal processing circuit connected to the modulator generating a measured value corresponding to the distance of the object and, (d) a phase control circuit (phase locked loop circuit) (66) connected to the modulator for feeding the beat signal and for providing an output frequency, the output frequency forming the measured value of the distance, further comprising (a) a velocity measuring device (144) connected to the distance measuring device for providing velocity signals, said velocity measuring device having a doppler signal transmitter (100) and (b) the distance- and velocity-signals supplied by the distance measuring device (94) and the velocity measuring device (144) respectively, are linked with each other.

7. Device as claimed in claim 6 characterized in that the combined distance- and velocity-measuring device provides outputs corresponding to velocities of vehicles only in a predetermined range of distance (174).

8. Device as claimed in claim 6 characterized in that the combined distance- and velocity-measuring device provides outputs corresponding to distances of vehicles only within a predetermined range of velocity.

9. Device as claimed in claim 6 characterized in that the combined distance- and velocity-measuring device processes signals received and provides outputs corresponding to measured velocities to indicate different lanes which are situated at different distances from the distance- and velocity-measuring device.

10. Device as claimed in claim 8 characterized in that the distance- and velocity-measuring device supplies a signal indicating the direction of travel of the detected vehicle.

11. Device as claimed in claim 6 characterized in that (a) the combined distance- and velocity-measuring device (182) is positioned on/in a vehicle (178, 180) in a direction of travel and the device supplies signals according to the distance d to a preceding vehicle (176 resp. 178) and to the variation of distance d and (b) further comprising a speed controller for receiving the signals representing the distance d and the variation of distance d to maintain a predetermined distance ds to the preceding vehicle.

* * * * *